United States Patent Office 3,113,045
Patented Dec. 3, 1963

3,113,045
PURIFICATION OF CANE JUICE BY LIMING
WITH GENTLE STIRRING
Paul W. Alston, 1042 Oxford St., Berkeley 7, Calif.
No Drawing. Filed Mar. 17, 1961, Ser. No. 96,367
6 Claims. (Cl. 127—50)

The present invention relates to a new and improved process for the preparation of sugar from sugar cane and is particularly directed to the removal of impurities from sugar cane mill juice before treatment to produce the syrup from which the sugar is crystallized.

Sugar is commonly prepared from sugar cane by a series of steps in which the cane is cut, delivered to the mills, and crushed to produce mill juice. The mill juice is then purified and evaporated to produce syrup from which the finished product is crystallized. Purification of the mill juice is usually accomplished by one of two processes. In one process a raw sugar is produced which is thereafter separately refined, and in the other conventional process granulated sugar is produced directly from cane.

In the production of a raw sugar which is later refined to granulated sugar in a separate process, clarification or defecation is employed to initially remove the maximum quantity of impurities from the juice at a point in the process consistent with consideration of clarity and reaction of the clarified juice. Hence, in the simple defecation process lime is added to the mill juice and the temperature raised to at least 200° F., preferably higher. This lime and heat treatment precipitates insoluble lime salts, coagulated albumin and varying proportions of fats, waxes, gums, and the like. The flocculent precipitate carries a high proportion of the finely suspended material of the juice which escapes mechanical screening. The precipitate is subsequently separated from the mill juice by subsidence and decantation. The amount of lime employed in this step varies widely between about 0.05 and 0.15 percent lime based on the weight of cane milled. Purification of the juice in the preparation of the raw syrup is critically important because it significantly affects the subsequent pan boiling, centrifuging, quality and yield of raw sugar. Speed of filtration and quality of the sugar in the refinery are also significantly affected by the effectiveness of the initial purification of the juice.

In a separate and distinct process for producing granulated sugar directly from cane, a liming and carbonation process is employed to purify mill juice. In the carbonation process, lime or milk of lime is added to the mill juice and the juice carbonated at approximately 131° F. The lime is added at a rate such that the alkalinity never exceeds approximately 800 milligrams of lime per liter corresponding to a pH value of from about 10.0 to 10.8. The calcium carbonate precipitate and coagulated impurities in the mill juice are then separated by conventional means such as filtration.

Because of the importance of the purification step, extensive experimentation has been carried forward in the industry to modify and improve prior methods such as the described simple defecation and carbonation methods. The present invention is directed to an improved method of purifying sugar cane mill juice, and is a continuation-in-part of parent application Serial No. 552,523, filed December 12, 1955, now U.S. Patent No. 2,976,189. This parent application is primarily directed to a novel purification step in the processing of sugar beets, whereas the present application is directed to an improved purification step in the processing of sugar cane.

In essence the present invention is directed to the improvement in the processing of sugar cane mill juice comprising essentially adding lime to the mill juice and keeping the juice gently moving at a rate below that at which precipitated impurities formed with the lime breaks up, and continuing addition of lime until strong somewhat granular curds of precipitate impurities are formed in the juice to provide a juice which is readily filterable.

For optimum precipitation of impurities and filtration of the coagulated precipitate, the lime is added stepwise in increments at spaced intervals to permit stabilization of the precipitate which forms at different alkalinities and to build up a relatively strong precipitate of impurities which does not readily disintegrate. Precipitated impurities are then separated from the juice without prior carbonation, after which the filtrate is further treated in the manner to be described.

The amount of lime required to produce a readily filterable precipitate of impurities in accordance with the present invention varies with each juice depending upon the type of sugar cane, and variables in the process of obtaining the juice accompanied by gentle stirring to an alkalinity of between about pH 7.0 and pH 7.5, a floc is formed in the juice. This corresponds to the clarification obtained in the production of raw sugar by the conventional defecation process. The resultant juice is not readily filterable. After a retention time of over a minute, lime is added in increments causing formation of large gelatinous curds of flocculent precipitate in a turbid juice. Upon further lime addition, smaller and more compact curds are formed in juice which will settle and give a clear juice upon standing, at which point the optimum filterability is approached. If the mill juice contains a substantial amount of soil the juice may be muddy, even though otherwise clear, until it has been allowed to stand and settle. Consequently, the appearance of the precipitate and the clarity of the diffusion juice may be utilized as indicia for indicating when sufficient lime has been added to the juice to produce a readily filterable precipitate.

The most accurate method of determining the optimum amount of lime for addition to the juice to provide a filterable precipitate of strong curds is to measure the filtration rate of the samples of juice after each stepwise addition of a small quantity of lime. This method is rapid and effective even when a visual end point is impractical because of the presence of soil which hides the otherwise clear nature of the milled juice. When the filtration rate reaches a maximum and begins to decrease upon further addition of lime, the amount of lime required for optimum filtration has been established. Broadly considered the quantity of lime for optimum filtration may vary considerably, but is generally found to range between approximately 0.05 percent and 0.25 percent lime by weight of sugar cane. The optimum alkalinity for filtration may also vary somewhat but generally falls within the range of pH 10.8 to pH 11.4.

The precipitate of impurities obtained by the method of the present invention is readily filterable without carbonation, and is composed of relatively strong curds of impurities which are not obtainable by any previous method of purification. Since the point of optimum filterability corresponds broadly to the point at which the maximum proportion of impurities are present as a filterable precipitate, a filtrate of high purity is readily obtainable upon further conventional treatment of the mill juice to provide a high yield of relatively pure cane sugar which is readily crystallized from the concentrated filtrate. Furthermore, the total amount of lime required for purification of the juice in accordance with the present invention is smaller than the amount employed for purification by conventional means. This decrease in the amount of lime required for purification of the cane sugar mill juice results in substantial savings when the method is utilized for the treatment of large quantities of mill juice.

The temperature at which the present purification process is carried out is critical and constitutes a clear departure from prior art methods of defecating cane sugar mill juice. In the past temperature has preferably been maintained at the boiling point in the simple defecation process. In contradistinction thereto the present invention carries forward the purification step at a temperature not substantially in excess of about 125° F. By carrying forward the process at this temperature, the problem of invert sugar destruction is altogether obviated. In the past destruction of invert sugar has caused both loss of sugar in the final molasses and has caused formation of objectionable substances or gums which interfere with the final crystallization. In accordance with the present method these problems are altogether avoided and a sugar of high quality is obtained.

The present method of liming and filtering the mill juice before carbonation also constitutes a distinct and significant advance over the carbonation process of purifying mill juice heretofore employed in the industry. In accordance with the conventional carbonation process the juice is limed, carbonated, and subsequently filtered. In the present invention, on the other hand, lime is added and the mill juice filtered before carbonation without heating the limed juice to a temperature which causes destruction of invert sugar. Only through utilization of the present process is it possible to produce a consistently filterable precipitate of impurities without carbonating or deleteriously heating the limed juice. This highly desirable result is due to the gentle stirring of the juice during formation of the precipitate and critical control of temperature and alkalinity throughout the purification step.

Describing now the present process in greater detail, the lime employed for purification of the juice is most conveniently added in the form of milk of lime, which is a suspension of calcium hydroxide in an aqueous solution.

The desired filterable precipitate of impurities is obtained by adding lime to the juice while the juice is kept in gentle motion without turbulence during formation of the precipitate, and by continuing addition of lime until a relatively filterable precipitate of relatively strong curds is obtained in a solution which is clear or clarifies upon standing. The temperature may vary from the ambient temperature up to about 125° F. but should not be substantially in excess of about 125° F. Best results are obtained with constant gentle stirring, but intermittent stirring may be employed. During the period in which lime is added to the diffusion juice, the juice is stirred at a rate below that which causes the precipitate to break up. If the limed diffusion juice is stirred or allowed to flow at a rate producing turbulence, curds of precipitated impurities disintegrate into particles which block passage of the diffusion juice through the filter and render direct filtration impractical. The determination of the optimum rate of stirring or movement of the juice for the formation of strong curds of precipitate is easily made by visual observation of the precipitate during addition of the lime. If the flocculent precipitate breaks up, the stirring rate or motion of the diffusion juice is reduced until the disintegration no longer occurs.

Stepwise addition of lime to the juice in increments at spaced intervals, accompanied by gentle stirring is desirable for best results in forming a readily filterable precipitate. Although a filterable precipitate may be obtained by fairly rapid addition of the major proportion of the lime followed by slow addition of lime up to the amount desired, the filter tends to become blocked and the rate of filtration is substantially reduced compared to a precipitate formed by lime added in increments. Consequently, the lime is advantageously added in at least two or three steps, accompanied by an interval at least a minute before further addition of lime, in order to allow the precipitate to become stabilized. However, the continuous addition of lime at a very slow rate over an extensive period produces results equivalent in actual stepwise addition of lime, and may be employed. Consequently, wherever stepwise addition of lime is referred to, it is also meant to include such slow continuous addition.

Since the character of the juice varies because of differences in the type of treatment of the cane and because of variables in the process of preparing mill juice, a particular numerical quantity of lime which will produce a satisfactory result of filtration for all juices will not usually be the same for all such juices, but can be readily ascertained by simple tests. For example, when lime is added to the juice in increments with gentle stirring in accordance with this invention, visual observation of the precipitate indicates when sufficient lime has been added. If lime is added to the juice, a fine precipitate is initially formed, followed by the appearance of large flocculent curds of gelatinous precipitate in a turbid liquid, and then by smaller and more solid curds in a substantially clear liquid when sufficient lime has been added to provide a precipitate that is readily filtered. Further addition of lime before filtration of the precipitate only reduces the rate at which the precipitated impurities can be filtered from the juice.

The juice is considered clear for the purposes of determining filterability by visual inspection even though the liquid is colored, provided that it is not substantially turbid. The large flocculent precipitate that occurs in a turbid solution just prior to the formation of the readily filterable precipitate is usually primarily composed of particles larger than about ¼ inch in diameter. When the optimum amount of lime has been added the precipitate changes into relatively granular curds less than about 1/16 inch in diameter suspended in the clear juice.

The most accurate means of determining the amount of lime required for formation of a precipitate that provides an optimum rate of filtration, is to add lime in small increments to a sample of the juice with gentle stirring, and measuring the rate of filtration of a portion of the sample after each addition of lime. Since the optimum lime addition is generally not approached until the solution begins to clear and the large gelatinous precipitate begins to change into granular curds, it is usually not necessary to commence measurements of the filtration rate before such time. The filtration rate increases rapidly with small additions of lime as the amount of lime approaches a quantity that provides the maximum rate of filtration. After the optimum amount of lime has been added, further addition of lime results in a marked decrease in the rate of filtration of the juice. Consequently, the desired quantity of lime for best filtration of any particular juice is readily determined from a comparison of filtration rates obtained with increasing amounts of lime, and by employing the amount that provides a maximum rate for filtration.

For example, a suitable method of determining the proportional amount of lime required to produce precipitate that is readily filterable is to place a sample of about 1500 milliliters of the juice in a two liter beaker, and add small increments of about 0.05 percent by weight CaO based on the weight of cane, while stirring gently. The additions of lime are spaced about two minutes apart to permit the precipitate to stabilize. When a heavy voluminous precipitate has formed, the clarity of the supernatant juice is observed after a wait of about three minutes. If the juice is still turbid, additions of lime are continued in smaller increments of about 0.01 percent of lime based on the weight of cane. As soon as the juice commences to become clear, and the large flocculent precipitate begins changing into a smaller more granular form, filtration tests are commenced.

The filtration tests are readily conducted by transfer of about 300 milliliters of the limed juice from a beaker to a stemless funnel fitted with a filter that provides rapid filtration in a clear filtrate. The volume of juice filtered in any selected period of time, such as one minute, is determined after each addition of a small increment of lime until further lime addition results in a lowering of filtration rate. Generally any rate of filtration faster than 50 milliliters per minute with a 4 inch diameter funnel indicates that a readily filterable precipitate has been obtained.

The amount of lime added to the juice may be measured in terms of the percent by weight of lime based upon the weight of cane milled, which is a measure commonly employed in the sugar industry, or by means of conventional pH of the limed juice. Because of reactions of lime at various concentrations with impurities in the juice, the pH does not increase in proportion to the amount of lime with each addition of lime. Nevertheless, the pH of the limed juice provides a measure of the lime concentration that may be duplicated as long as a consistent method of determining the pH is employed, and the pH is most conveniently utilized for controlling the quantity of lime added to juice in a continuous liming apparatus. The pH of the limed juice may readily be determined by a pH meter, such as a glass calomel electrode.

Periodic determinations of the optimum amount of lime required for optimum filtration of the limed juice are regularly made whenever any conditions of extraction are varied. With most juices, the optimum amount of lime for best filtration is at a pH of approximately 10.8 to 11.4. In terms of lime concentration, 0.05 percent to 0.25 percent by weight CaO based on the weight of the cane milled is preferred.

After the optimum amount of lime has been added to the juice, the juice is preferably heated to increase the rate of filtration. The preferred temperature for filtration is not substantially in excess of about 125° F. Higher temperatures destroy invert sugar. Destruction of invert sugar causes both loss of sugar in the final molasses and formation of objectionable substances or gums which interfere with the final crystallization.

The limed juice is now separated from the precipitate in any conventional manner. A filter that subjects the flocculated curd to a minimum amount of pressure during filtration is preferred so that the precipitate is not compressed into a relatively non-porous cake that prevents filtration. Although any filter that operates under a low head of liquid pressure may be employed, a preferred form of filter is disclosed in detail in applicant's Patent No. 2,880,875. Although decantation may be used to separate the juice from the curds of precipitated impurities, it is a slow and inefficient process, since the precipitate settles very slowly. It is consequently preferred to filter the precipitate. Because of the controlled conditions of temperature and alkalinity and the manner of adding lime to the mill juice, filtration is accomplished without difficulty.

The filtrate prepared in accordance with the described purification step may now be treated in any manner conventional to the art for the preparation of granulated cane sugar. Preferably, the filtrate is promptly carbonated at about the temperature at which it was filtered to a pH of between about 7.0 and 9.0. The juice may be further heated at this lower pH value. Alternately, if desired, the filtrate may be carbonated to remove excess lime, and then separated from the resultant precipitate and evaporated in the conventional manner of making raw syrup. This procedure provides a raw syrup of greatly improved purity. Further purification may be economically accomplished by adding additional lime to the filtrate, subjecting the limed filtrate to carbonation with carbon dioxide in order to precipitate additional impurities, and separating the limed juice filtrate from the precipitate formed by carbonation.

More specifically, the mill juice purified in accordance with the method of the present invention may subsequently be carbonated to a pH of from about 7.0 to 8.0 and then treated in accordance with the DeHaan carbonation process. In the DeHaan process mill juice is first treated with milk of lime and the excess lime carbonated at a temperature of approximately 131° F. (55° C.). The milk of lime is added so that alkalinity does not exceed 800 milligrams of lime per liter. To accomplish this result, the lime must be regulated by continuous control of the alkalinity.

Later studies have modified the DeHaan carbonation process and these modifications may also be employed with the cane sugar juice purified in accordance with the present invention. Among other modifications it has been found desirable to apply higher alkalinities for optimum filtration than those specified by DeHaan. If the alkalinity during the entire carbonation process is maintained at a low level, i.e. 400 milligrams of lime per liter of juice, a difference exists in the structure of the precipitate compared with precipitates formed at higher alkalinities. Carbonation precipitates formed at a low alkalinity level manifest a dark color and do not possess the easy settling structure of precipitates formed at higher alkalinities.

The presently accepted modification of the DeHaan process commonly employed in the industry and which may be applied to sugar cane juice which has been filtered before carbonation in accordance with the present invention, comprises essentially heating the juice to 131° F. (55° C.) and adding lime to an alkalinity of approximately pH 10.5 to form a floc. The prelimed juice is then subjected to a carbonation in which the addition of milk of lime is adjusted to the rate of saturation. For an optimum adsorption of the used carbon dioxide gas the alkalinity is maintained at approximately 500 to 1000 milligrams of lime per liter. Subsequent to the addition of the milk of lime, the final alkalinity of the juice to be filtered must be maintained at approximately pH 10.0 to pH 10.5 corresponding to the titration alkalinity of 400 to 800 milligrams of milk of lime per liter of juice. These four steps may, if desired, be carried forward employing either a continuous or batch system with satisfactory results.

Alternatively, the precarbonation limed and filtered sugar cane juice of the present invention may be treated in accordance with the novel method described in detail in copending application Serial No. 96,365, filed March 17, 1961. In accordance with this method the limed and filtered mill juice of the present invention is initially carbonated. Though the carbonation temperature may vary considerably, the temperature at which the filtering was carried out or room temperature has proved most convenient. The carbonation is carried out to an alkalinity of approximately pH 7.0 to 9.0. The carbonation is conducted in order to lower the pH so that a small quantity of lime may be added without increasing the alkalinity to a point at which invert sugars are destroyed. The prevention of the destruction of invert sugars is a critical aspect of the present invention, since such destruction causes both loss of sugar in the final molasses and the formation of objectionable substances which interfere with the final crystallization of the cane sugar.

After the carbonation, from about 0.05 percent to 0.15 percent by weight lime based on cane is added to assist in the precipitation of lime salt. The addition of the lime must not cause the alkalinity to rise above about pH 9.5. The liquor is then heated to a temperature not exceeding 160° F. and carbonation carried forward to an alkalinity corresponding to a low lime salt content, preferably the minimum lime salt content. In terms of pH values this point generally falls within a range of about pH 6.8 to 7.8, and commonly falls within the range pH 7.0 to pH 7.5 An alkalinity below pH 6.8 promotes the undesirable inversion of sucrose during the subsequent evaporation step. An alkalinity above pH 7.8 causes the destruction of invert sugar during the evaporation step.

Approximately 50 to 150 parts sulfur dioxide per million parts of juice is added as a color inhibitor and the liquor evaporated, preferably employing multiple effect evaporators. It should be noted that while the quantity of $SO_2$ employed may vary considerably the pH should preferably not be lowered more than approximately 0.2. This limitation is necessary to insure the maintenance of the optimum pH range. In raw sugar production the sulfuring step may be omitted.

The evaporation step constitutes a complete and significant departure from prior art methods of treating cane sugar mill juice at this point in the processing. The evaporation is carried out to a density of approximately 50° to 75° Brix. In this simple but unique manner a sigficant shortcoming of prior art sugar producing methods is obviated. It should be noted, however, that this advantage is only attained when the evaporation is conducted while the precipitate remains in the limed and carbonated juice and when the degree of evaporation is between about 50° and 75° Brix.

Extensive tests have shown that as the density at which the juice is limed and carbonated is increased, the amount of lime required for purification purposes is significantly decreased. As a practical matter evaporation below 50° Brix does not effect a significant advantage. 75° Brix is the practical upper limit for evaporation because crystallization is initiated above this point and the increased viscosity causes reduced carbon dioxide adsorption in the subsequent liming and carbonation steps. If remelt sugars are to be added to the thickened juice, it has been found desirable that the evaporation be conducted significantly below 75° Brix because the added remelt sugar increases the density and viscosity of the liquor. Consequently, when remelt sugar is added, the combination of evaporation and added remelt sugar should also bring the density to between about 50° and 75° Brix.

The thick juice prepared in accordance with the evaporation step is next treated with lime and carbonated in a series of tanks. The lime added to each tank must not raise the alkalinity above about pH 9.0 to pH 9.5, preferably pH 9.3 to pH 9.5. Alkalinity and temperature limitations during the carbonation step are necessary to prevent destruction of the invert sugar and inhibit color formation. The carbonation temperature preferably ranges between about 130° F. and 160° F. Below 130° F. organisms develop and biological activity is noted. Above 160° F. there is danger of invert sugar destruction and color formation. The pH value at the end of the final tank should be at the optimum for minimum lime salt content, usually approximately 6.8 to 8.0. The alkalinity of the juice as it leaves each successive tank should be approximately pH 7.2 to pH 7.6 to prevent the succeeding lime addition from raising the pH above the critical point at which the invert sugar is destroyed.

It should be noted that the liming and carbonating may be carried out sequentially, i.e. liming and then carbonation with carbon dioxide, or simultaneously. It should also be noted that the step of carbonating may be carried out in a batch system or in a continuous system. Though this unique step constitutes a significant departure from prior art methods the thick juice treatment is not limited to the simultaneous addition of lime and carbon dioxide but clearly encompasses either sequential or simultaneous addition. Moreover, it should be clearly understood that the present invention which is directed to the precarbonation filtration of limed sugar juice may be employed with any conventional purification step.

In the continuous liming-carbonation system for thick juices prepared by evaporation of the cane sugar juice, the liming and carbonation is effected in a series of tanks preferably disposed to permit gravity flow between adjacent tanks. The number of tanks in the series is determined by the quantity of lime required to obtain the desired optimum purity. All tanks in the series are preferably equal in size and dimension and are disposed relative to one another to permit easy flow between adjacent tanks. The juice and added lime enter the first tank near the top flowing downwardly and outwardly from the bottom up to an overflow which controls the juice level in the tank, thence into the upper part of the next unit in the series. In each tank the lime is preferably added to the juice before the juice enters the carbonating tank. This permits the pH of the thick juice entering the carbonating unit to be controlled. The carbon dioxide supply line is substantially identical in construction to those employed in second carbonation stations. Each tank receives approximately the same quantity of lime.

After the liming and carbonation, the temperature is raised to approximately 170° to 185° F. for filtration, preferably employing a pressure filter. This temperature range is not critical but has proven desirable in order to increase the rate of filtration.

The juice is now crystallized to form sugar in the conventional manner. Crystallization may be effected employing a vacuum pan which develops and grows sugar crystals from the syrup or molasses fed to it during operation. There are generally two types of vacuum pans employed for cane sugar crystallization, namely, coil and calandria. The design and accessories are similar, the differences being essentially in disposition of the heating surfaces, as is known to those well versed in the art.

Employing the new and novel steps of the present invention it is possible to employ significantly less lime than heretofore felt necessary for the production of a standard granulated sugar from cane, yet produce cane sugar which is significantly superior to the product produced by conventional defecation methods. In the production of raw sugar, the present preliming and filtering method required the use of more lime than the conventional defecation process, but results in an economical increase in sugar production.

The following are typical examples of the purification of cane sugar juices in accordance with the present invention. In all the following examples, the soluble solids in the juice are expressed in Brix as measured on the conventional Brix hydrometer scales; and the purity is the apparent purity in percent based on the ratio of sucrose, measured by polarization, to the soluble solids of the juice as measured on the Brix hydrometer scale.

In the following examples batch defecation was employed with a 55 gallon capacity tank for the defecation equipped with a hand paddle for stirring. The defecation filter used was a continuous gravity filter built in accordance with the teaching of U.S. Patent 2,880,875, and had a capacity of 3 gallons/minute. The juice was raised to the filtration temperature by means of a steam coil inserted into the juice after defecation was completed. The liming and carbonating of the defecation filtrate was accomplished in a 5 gallon container equipped with steam coil and carbon dioxide distributor. The evaporator was a single effect vacuum evaporator operated batchwise. The liming and carbonating of the thick juice was accomplished in a 4 liter beaker equipped with a pH meter, steam coil and gas distributor. Filtration of the finished thick juice was accomplished through cotton filter cloth by gravity head.

In the first example, mixed mill juice was obtained from a twelve roller mill at a temperature of 98° and used for a preliminary test for optimum pH. Lime was added as milk of lime to produce a pH value of 7.5, corresponding to the same value used for defecation at the mill. This resulted in a slow settling juice that filtered dropwise and produced a slightly cloudy filtrate when tested with a 4 inch stemless laboratory funnel fitted with fast filtering paper used in sugar mill laboratories. This initial liming required 0.7 percent CaO based on the weight of cane milled.

Lime additions in the amount of 0.05 percent lime based on cane milled were made at intervals of three minutes accompanied by gentle stirring until a clear supernatant juice was obtained that filtered streamwise on the test filter. This required three further additions of 0.05 percent lime, making a total of 0.22 percent lime based on the weight of cane milled to obtain a clear filtrate. The pH at this point was 10.8 and the rate of filtration was 20 ml./min. Further lime addition was made in increments of 0.2 percent lime based on weight of cane at intervals of three minutes. The results are tabulated.

| Percent CaO/Cane | pH | Appearance | Filtration Rate |
|---|---|---|---|
| 0.070 | 7.5 | Cloudy | Dropwise cloudy. |
| 0.12 | 9.0 | ____do____ | No. |
| 0.17 | 10.0 | ____do____ | Dropwise cloudy. |
| 0.22 | 10.8 | Clear | 20 Ml/Min. Clear. |
| .24 | 11.0 | ____do____ | 20 Ml. Clear. |
| .26 | 11.1 | ____do____ | 40 Ml. Clear. |
| .28 | 11.2 | ____do____ | 60 Ml. Clear. |
| .30 | 11.4 | ____do____ | 40 Ml. Clear. |

The value of 11.2 pH for liming was used in a series of tests. The defecation was performed as described in the preliminary test. The defecated juice was warmed to 125° F. and filtered by gravity in the small pilot continuous filter previously described.

The filtrate was immediately carbonated at the effluent temperature to pH 7.5, then raised to a temperature of 160° F. Maintaining this temperature the carbonated filtrate was simultaneously limed and carbonated while maintaining an alkalinity of pH 9.5. The lime addition at this point was 0.72 percent lime based on the weight of cane milled to give a total lime addition of 1.0 percent for defecation and carbonation. After this lime addition was completed the carbonation was continued to a pH value of 7.2 to 7.5. The limed and carbonated juice was heated to 175°–180° F. and filtered.

The purity increase is shown in the following table:

| Run No. | Purity Milled Juice | Purity Defecated Juice | Purity Rise | Total Lime Percent Cane |
|---|---|---|---|---|
| 1 | 82.7 | 87.5 | 3.8 | 1.0 |
| 2 | 83.8 | 89.1 | 5.4 | 1.0 |
| 3 | 87.3 | 91.0 | 3.7 | 1.0 |

The purity rise obtained at the factory from milled juice to clarified juice in the production of raw sugar was 0.8 percent purity using 0.15 percent lime based on the weight of cane milled. In a second example, the defecation filtrate obtained in the manner described in the first example was immediately carbonated to pH 8.5. While continuing carbonation 0.11 percent lime by weight of sugar cane was added to the juice and carbonation continued to a pH of 7.5. 100 parts $SO_2$ was then added per million parts juice. Without filtering off the precipitate, the juice was evaporated to 60° Brix. The thick juice thus produced was maintained at a temperature of 160° F. while simultaneously carbonating and adding sufficient lime to make the total lime employed for defecation and thick juice carbonation equal to approximately 0.75 percent lime by weight of cane. During the liming and carbonation of the juice at 160° F. the alkalinity was maintained at pH 9.3 to 9.5 until lime addition was complete. Carbonation was then continued to the final alkalinity value of pH 7.2. The syrup was then heated to 175° F. for filtration. Purity rise between mixed juice purity and thick juice purity was 4.8 percent. Employing the normal method of treating sugar cane, the purity rise at the factory in making raw sugar is 0.8 percent. Hence these tests indicate that a significant 4 percent purity rise over and above the conventional method of preparing raw sugar can be obtained employing the method of the present invention.

I claim:

1. The method of removing impurities from cane sugar mill juice which comprises adding as a precipitant only lime to said juice in increments until between about 0.05 percent and 0.25 percent by weight CaO has been added based on the weight of sugar cane, and a filterable precipitant of curds of impurities is formed, gently stirring said juice during formation of said precipitate at a rate below that at which the precipitate breaks up, heating said juice to a temperature not substantially in excess of about 125° F., filtering said juice in order to separate the precipitated impurities from the juice prior to substantial introduction of carbon dioxide into said juice, then subjecting the filtrate from the filtered juice to further carbon dioxide gas to precipitate additional impurities, and separating the juice from the precipitate formed upon subjecting the filtrate to carbon dioxide gas.

2. The method of removing impurities from cane sugar mill juice which comprises adding as a precipitant only lime to said juice in increments until an alkalinity ranging between pH 10.8 and 11.4 is attained, and a filterable precipitant of curds of impurities is formed, gently stirring said juice during formation of said precipitate at a rate below that at which the precipitate breaks up, heating said juice at a temperature not substantially in excess of about 125° F., filtering said juice in order to separate the precipitated impurities from the juice prior to substantial introduction of carbon dioxide into said juice, then subjecting the filtrate from the filtered juice to further carbon dioxide gas to precipitate additional impurities, and separating the juice from the precipitate formed upon subjecting the filtrate to carbon dioxide gas.

3. The method of removing impurities from cane sugar mill juice which comprises adding lime to said juice in increments at intervals of at least one minute to form a precipitate of impurities, stirring said juice during formation of said precipitate at a rate below that at which the precipitate breaks up because of turbulence, continuing the addition of lime until between about 0.05 percent and 0.25 percent by weight CaO has been added based on the weight of sugar cane, and a flocculent precipitate formed in cloudy juice is transformed into smaller more granular curds of precipitated impurities to provide a readily filterable precipitate in the juice, stopping further addition of lime to said juice, heating said juice to a temperature not substantially in excess of 125° F., filtering said juice prior to substantial introduction of carbon dioxide into said juice, adding additional lime to the filtrate from the filtered juice, subjecting the limed filtrate from the juice to carbon dioxide gas to precipitate additional impurities, and separating the juice from the precipitate formed by the additional lime and the carbon dioxide gas.

4. The method of removing impurities from cane sugar mill juice which comprises adding lime to said juice in increments at intervals of at least one minute to form a precipitate of impurities, stirring said juice during formation of said precipitate at a rate below that at which the precipitate breaks up because of turbulence, continuing the addition of lime until an alkalinity ranging between pH 10.8 and 11.4 is attained, and a large flocculent precipitate formed in cloudy juice is transformed into smaller more granular curds of precipitated impurities to provide a readily filterable precipitate in the juice, stopping further addition of lime to said juice, heating said juice to a temperature not substantially in excess of about 125° F., filtering said juice prior to substantial introduction of carbon dioxide into said juice in order to separate the precipitated impurities from the juice, adding additional lime to the filtrate from the filtered juice, subjecting the limed filtrate from the juice to carbon dioxide gas to precipitate additional impurities, and separating the juice from the precipitate formed by the additional lime and the carbon dioxide gas.

5. In the purification of cane sugar mill juice which comprises adding lime to the juice in increments at intervals of at least one minute to form a precipitate of impurities, stirring said juice during formation of said precipitate at a rate below that at which the precipitate breaks up because of turbulence, continuing the addition of lime until between about 0.05 percent and 0.25 percent by weight CaO has been added based on the weight of sugar cane, and a large flocculent precipitate composed principally of particles of flocculent larger than ¼ inch in cloudy diffusion juice is transformed into smaller more granular curds of precipitated impurities less than 1/16 of an inch, heating the juice to a temperature not substantially in excess of about 125° F., filtering said juice prior to substantial introduction of carbon dioxide into said juice, adding additional lime to the filtrate of said juice, subjecting the limed filtrate from the juice to carbon dioxide gas in order to precipitate additional impurities, and separating the limed juice filtrate from the precipitate formed by the additional lime and the carbon dioxide gas.

6. In the purification of cane sugar mill juice which comprises adding lime to the juice in increments at intervals of at least one minute to form a precipitate of impurities, stirring said juice during formation of said precipitate at a rate below that at which the precipitate breaks up because of turbulence, continuing the addition of lime until an alkalinity ranging between pH 10.8 and pH 11.4 is attained, and a large flocculent precipitate composed principally of particles of flocculent larger than ¼ inch in cloudy diffusion juice is transformed into smaller more granular curds of precipitated impurities less than 1/16 of an inch, heating the juice to a temperature not substantially in excess of about 125° F., filtering said juice prior to substantial introduction of carbon dioxide into said juice, adding additional lime to the filtrate of said juice, subjecting the limed filtrate from the juice to carbon dioxide gas in order to precipitate additional impurities, and separating the limed juice filtrate from the precipitate formed by the additional lime and the carbon dioxide gas.

References Cited in the file of this patent

UNITED STATES PATENTS

| | | |
|---|---|---|
| 1,903,215 | Graham | Mar. 28, 1933 |
| 2,076,189 | Alston | Mar. 21, 1961 |

OTHER REFERENCES

Bardorf: Elements of Sugar Refining; 1925, The Chemical Publishing Co., Easton, Pa.; page 57.